(12) United States Patent
Suwald

(10) Patent No.: US 10,444,268 B2
(45) Date of Patent: Oct. 15, 2019

(54) SENSOR SYSTEM AND SENSING METHOD

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/944,719

(22) Filed: Apr. 3, 2018

(65) Prior Publication Data

US 2018/0284172 A1 Oct. 4, 2018

(30) Foreign Application Priority Data

Apr. 4, 2017 (EP) .................................. 17164721

(51) Int. Cl.
| | | |
|---|---|---|
| *G01R 27/26* | (2006.01) | |
| *G06F 3/044* | (2006.01) | |
| *H03K 17/96* | (2006.01) | |
| *G01D 5/24* | (2006.01) | |
| *G06F 3/041* | (2006.01) | |
| *G06F 3/02* | (2006.01) | |
| *G07F 7/08* | (2006.01) | |
| *G07F 7/10* | (2006.01) | |

(52) U.S. Cl.
CPC ........... *G01R 27/2605* (2013.01); *G01D 5/24* (2013.01); *G06F 3/0202* (2013.01); *G06F 3/044* (2013.01); *G06F 3/0416* (2013.01); *G07F 7/0853* (2013.01); *G07F 7/1008* (2013.01); *H03K 17/9622* (2013.01)

(58) Field of Classification Search
CPC .... G01D 5/24; G01R 27/2605; G06F 3/0202; G06F 3/0416; G06F 3/044; G06F 1/325; G06F 21/36; G07F 7/0853; G07F 7/1008; G07F 7/0873; H03K 17/9622
See application file for complete search history.

(56) References Cited

U.S. PATENT DOCUMENTS

| | | | |
|---|---|---|---|
| 9,317,164 B2 | 4/2016 | Suwald | |
| 9,323,353 B1 | 4/2016 | Sivertsen | |
| 2012/0126941 A1* | 5/2012 | Coggill | .................. G06F 21/36 340/5.54 |
| 2014/0091815 A1 | 4/2014 | Suwald | |
| 2014/0152610 A1* | 6/2014 | Suwald | .................... G01D 5/24 345/174 |

(Continued)

FOREIGN PATENT DOCUMENTS

EP    3 035 173 A1    6/2016

OTHER PUBLICATIONS

Extended European Search Report for Patent Appl. No. 17164721.7 (dated Aug. 3, 2017).

*Primary Examiner* — Richard J Hong

(57) ABSTRACT

In accordance with a first aspect of the present disclosure, a sensor system comprising a processing unit and an array of sensor elements, wherein the processing unit is configured to: identify mutually different sets of sensor elements within the array and step sequentially through said sets; identify mutually different subsets of sensor elements within said sets and step sequentially through said subsets; concurrently sample the sensor elements within said subsets. In accordance with a second aspect of the present disclosure, a corresponding sensing method is conceived. In accordance with a third aspect of the present disclosure, a corresponding computer program is provided.

13 Claims, 19 Drawing Sheets

(56) References Cited

U.S. PATENT DOCUMENTS

2015/0302289 A1* 10/2015 Suwald ................ G07F 7/0873
                                                                 235/492
2016/0170532 A1   6/2016 Suwald
2017/0123474 A1* 5/2017 Tang ....................... G06F 1/325
2018/0203544 A1   7/2018 Suwald

* cited by examiner

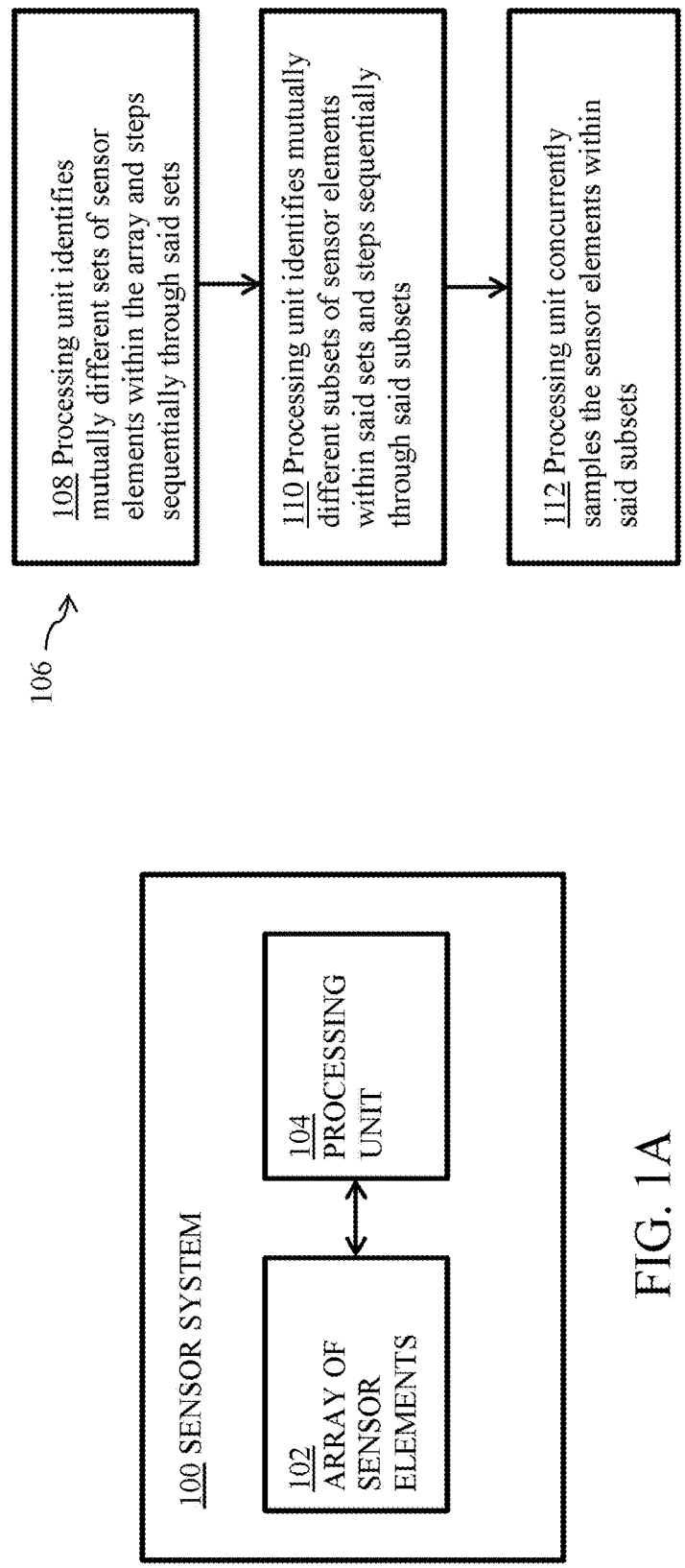

FIG. 9

Top group:
- Wx = 1, Wy = 1
- Wx = 1, Wy = -1
- Wx = 0, Wy = 0
- Wx = -1, Wy = 1
- Wx = -1, Wy = -1

Middle group: $a_1$, $a_2$, $a_3$, $a_4$, $a_5$

Bottom group (900): $c_1$, $c_2$, $c_3$, $c_4$, $c_5$

|  |  |  |
|---|---|---|
| $W_x = 1$ $W_y = 1$ | $W_x = 1$ $W_y = 0$ | $W_x = 1$ $W_y = -1$ |
| $W_x = 0$ $W_y = 1$ | $W_x = 0$ $W_y = 0$ | $W_x = 0$ $W_y = -1$ |
| $W_x = -1$ $W_y = 1$ | $W_x = -1$ $W_y = 0$ | $W_x = -1$ $W_y = -1$ |

|  |  |  |
|---|---|---|
| $a_3$ | $a_4$ | $a_5$ |
| $a_2$ | $a_9$ | $a_6$ |
| $a_1$ | $a_8$ | $a_7$ |

1600

|  |  |  |
|---|---|---|
| $c_3$ | $c_4$ | $c_5$ |
| $c_2$ | $c_9$ | $c_6$ |
| $c_1$ | $c_8$ | $c_7$ |

FIG. 16

SENSOR SYSTEM AND SENSING METHOD

CROSS-REFERENCE TO RELATED APPLICATIONS

This application claims the priority under 35 U.S.C. § 119 of European patent application No. 17164721.7, filed on Apr. 4, 2017, the contents of which are incorporated by reference herein.

FIELD

The present disclosure relates to a sensor system. Furthermore, the present disclosure relates to a corresponding sensing method, and to a corresponding computer program.

BACKGROUND

Today, electronic devices such as smart cards are widely used in society. For example, smart cards may be used as electronic identity (eID) cards and payment cards (e.g., bank cards). Although these cards are relatively secure due to their cryptographic capabilities, they are usually not equipped with a user interface suitable for entering user credentials, i.e. a so-called "authentication interface". As a consequence, most card users still enter their PIN code through personal computers and laptops, which increases the risk that their credentials are intercepted by malicious software such as Trojans and key-logger programs. Some smart cards have been equipped with embedded touch-based user interfaces, such as capacitive sensor structures. However, it may be difficult to implement a touch-based interface that accurately captures touch events while using only a small amount of power. The same challenge may exist for touch-based interfaces that are embedded in other types of electronic devices, such as Internet-of-Things (IoT) devices and wearable devices.

SUMMARY

In accordance with a first aspect of the present disclosure, a sensor system comprising a processing unit and an array of sensor elements, wherein the processing unit is configured to: identify mutually different sets of sensor elements within the array and step sequentially through said sets; identify mutually different subsets of sensor elements within said sets and step sequentially through said subsets; concurrently sample the sensor elements within said subsets.

In one or more embodiments, the array comprises N sensor elements and each set comprises M sensor elements, wherein M<N and N and M are integers.

In one or more embodiments, each subset comprises (M-1) sensor elements.

In one or more embodiments, N=5 and M=3.

In one or more embodiments, N=9 and M=4.

In one or more embodiments, the sensor elements comprise sensor capacitors, and concurrently sampling the sensor elements comprises measuring the accumulated capacitance of said sensor capacitors.

In one or more embodiments, the processing unit is further configured to identify and skip redundant subset steps.

In one or more embodiments, the processing unit is connected to the array of sensor elements through a plurality of switching elements.

In one or more embodiments, the switching elements comprise general-purpose input/output, GPIO, pins.

In one or more embodiments, the processing unit is a microcontroller.

In one or more embodiments, the sensor system is a touch-based sensor system.

In one or more embodiments, a smart card comprises a sensor system of the kind set forth.

In one or more embodiments, a wearable device comprises a sensor system of the kind set forth.

In accordance with a second aspect of the present disclosure, a sensing method is conceived for use in a sensor system, wherein the sensor system comprises a processing unit and an array of sensor elements, and wherein the method comprises: the processing unit identifies mutually different sets of sensor elements within the array and steps sequentially through said sets; the processing unit identifies mutually different subsets of sensor elements within said sets and steps sequentially through said subsets; the processing unit concurrently samples the sensor elements within said subsets.

In accordance with a third aspect of the present disclosure, a computer program is provided comprising non-transient instructions that, when executed by a processing unit, cause said processing unit to carry out a method of the kind set forth.

DESCRIPTION OF DRAWINGS

Embodiments will be described in more detail with reference to the appended drawings, in which:

FIG. 1A shows an illustrative embodiment of a sensor system;

FIG. 1B shows an illustrative embodiment of a sensing method;

FIG. 9 shows a schematic sensor capacitor arrangement;

FIG. 16 shows a schematic sensor capacitor arrangement;

DESCRIPTION OF EMBODIMENTS

Figure 2B:
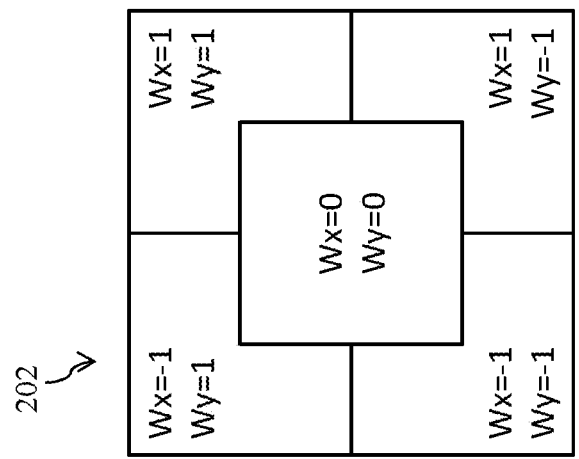
FIG. 2B shows an example of x- and y-weights of the sensor layout.

As mentioned above, it may be difficult to implement a touch-based interface that accurately captures touch events while using only a small amount of power. In particular, these interfaces, which may be implemented as capacitive sensor structures, may be covered by one or more insulating layers. For instance, if such structures are integrated into a smart card, they may be covered by layers of the smart card. In that case, the sensitivity of the sensors may be negatively affected by the presence of the insulating layers. In order to mitigate the effect of these layers, the sensor capacitors may have to be provided with a higher supply voltage. However, this in turn negatively affects the power consumption of the sensor system. The presently disclosed sensor system and sensing method facilitate increasing the sensitivity of the sensors while keeping the power consumption within acceptable limits. It is noted that the presently disclosed sensor system and sensor method are not limited to a smart card; they can also be used to advantage in other devices, for example Internet-of-Things (IoT) devices and wearable devices.

FIG. 1A shows an illustrative embodiment of a sensor system 100 in accordance with a first aspect of the present disclosure. The sensor system 100 comprises an array 102 of sensor elements. The array 102 of sensor elements is operatively coupled to a processing unit 104. In use, the sensor system 100 operates as described with reference to FIG. 1B.

FIG. 1B shows an illustrative embodiment of a sensing method 106 in accordance with a second aspect of the present disclosure. The sensing method 106 comprises the following steps. At 108, the processing unit 104 identifies mutually different sets of sensor elements within the array 102 and steps sequentially through said sets. At 110, the processing unit 104 identifies, mutually different subsets of sensor elements within said sets and steps sequentially through said subsets. At 112, the processing unit 104 concurrently samples the sensor elements within said subsets. By concurrently sampling sensor elements the sensitivity of the sensor may be increased. For instance, in practical and efficient implementation, the sensor elements comprise sensor capacitors, and concurrently sampling the sensor elements comprises measuring the accumulated capacitance of said sensor capacitors. In this implementation, the accumulated capacitance may have a high capacitance-to-noise ratio, compared to measuring the individual capacitance of the sensor capacitors. At the same time, identifying and sequentially stepping through sets and subsets of sensor elements keeps the power consumption within acceptable limits. The presently disclosed sensing method will be illustrated with more detailed examples herein below. The method may be carried out by a computer program executed by the processing unit 104.

In one or more embodiments, the array comprises N sensor elements and each set comprises M sensor elements, wherein M<N and N and M are integers. Furthermore, in one or more embodiments, each subset comprises (M-1) sensor elements. These embodiments facilitate achieving a high sensitivity while reducing the power consumption. For example, in practical and efficient implementation, N=5 and M=3. In another practical and efficient implementation, N=9 and M=4. Furthermore, the sensor system may be a touch-based sensor system that may be used to advantage in a smart card, Internet-of-Things (IoT) device or wearable device.

Figure 2A:
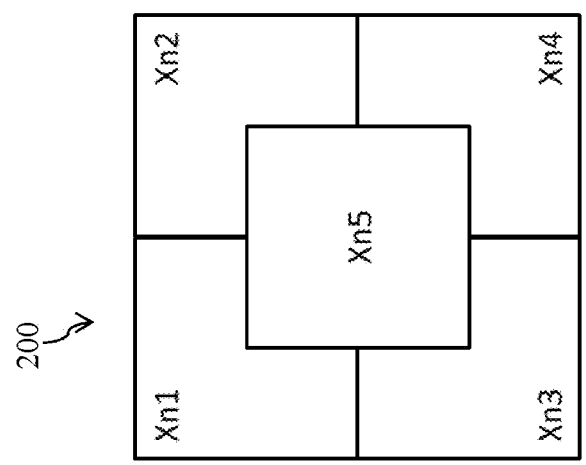
FIG. 2A shows an example of a 5-field two-dimensional sensor layout.

FIG. 2A shows an example of a 5-field two-dimensional sensor layout 200. In particular, sensor capacitors, which are schematically shown as Xn1 to Xn5 in FIG. 2A, may form a two-dimensional position sensing device. The principle of such device has been disclosed in EP 3 035 173 A1, titled "User interface unit, electronic device and manufacturing method". In accordance with the present disclosure, sensor capacitors within particular subsets of the whole array of sensor capacitors are sampled concurrently. In this way, the sensitivity of the sensor may be increased. Furthermore, the impact of sensor capacitors that do not directly contribute to the capacitance measurement may be reduced. It is noted that, as used herein, the term "evaluate" refers to sampling a sensor element. Thus, the sensor capacitors within said subsets are evaluated concurrently instead of individually. The individual capacitances associated with specific sensor capacitors may be derived from the capacitance measurements by a calculation.

FIG. 2B shows an example of x- and y-weights 202 of the sensor layout 200 shown in FIG. 2A. That is to say, the derived individual capacitances (or "activity levels") of the sensor capacitors may be weighted by a weighting function. The purpose of the weighting function is to assign position weights to the activity levels of each sensor capacitor in order to facilitate the calculation of the weighted center of activities as position-weighted average of all activity levels.

Figure 2C:
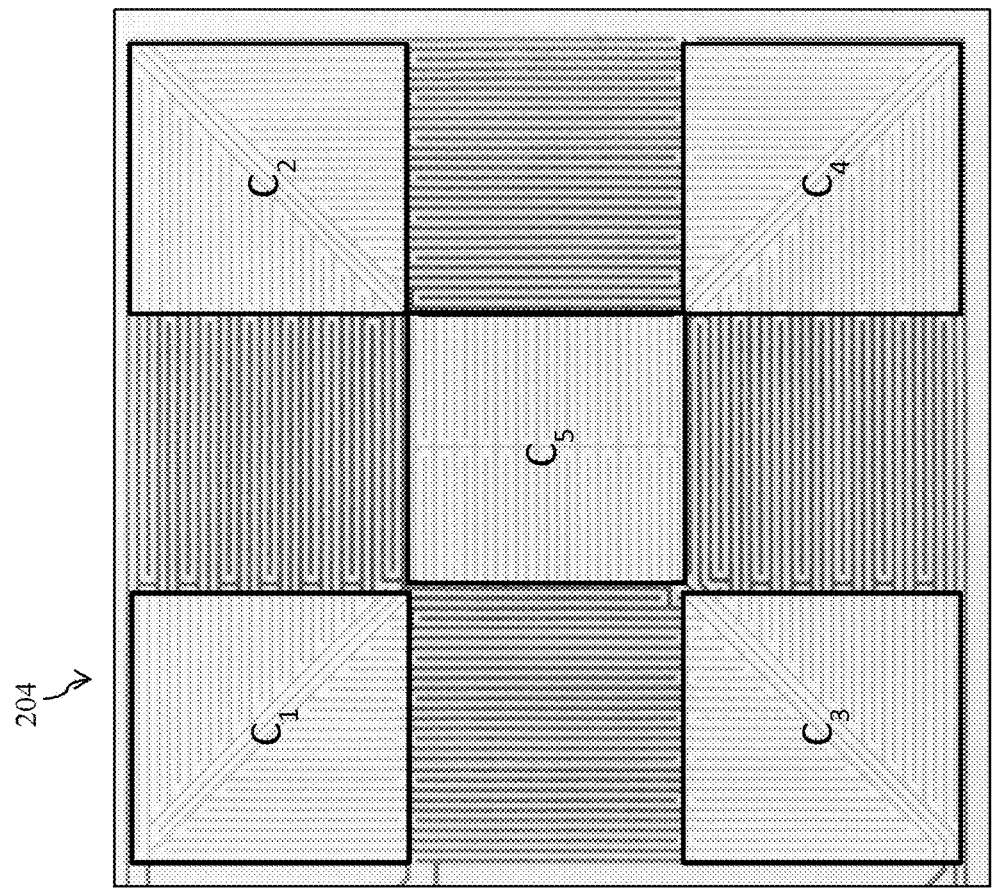
FIG. 2C shows an illustrative embodiment of a sensor implementation.

FIG. 2C shows an illustrative embodiment of a sensor implementation 204. In particular, it shows an implementation of the schematically illustrated sensor of FIG. 2A. The sensor capacitors C1 to C5 may be implemented as electrode pairs, more specifically by a combination of a separate electrode (x-electrode) for each capacitor and an electrode (y-electrode) which is common to all capacitors. By sampling the sensor capacitors, i.e. by measuring the capacitance present on the capacitors, position information can be generated. The position information may be indicative of the position of a finger in a two-dimensional plane. The presently disclosed method is well suited for implementation on microcontrollers. It is noted that the position information may also be indicative of the position of other objects than a finger, for example a stylus or a touch pen. Furthermore, a user input may be derived from the position information. For example, a sequence of captured positions may represent a handwritten PIN. After the handwritten PIN has been captured by the presently disclosed sensor system, it may for example be used to authorize a monetary transaction. The PIN may be verified on the smart card instead of remotely. In this way, a secure transaction authorization system can be realized.

Figure 3:
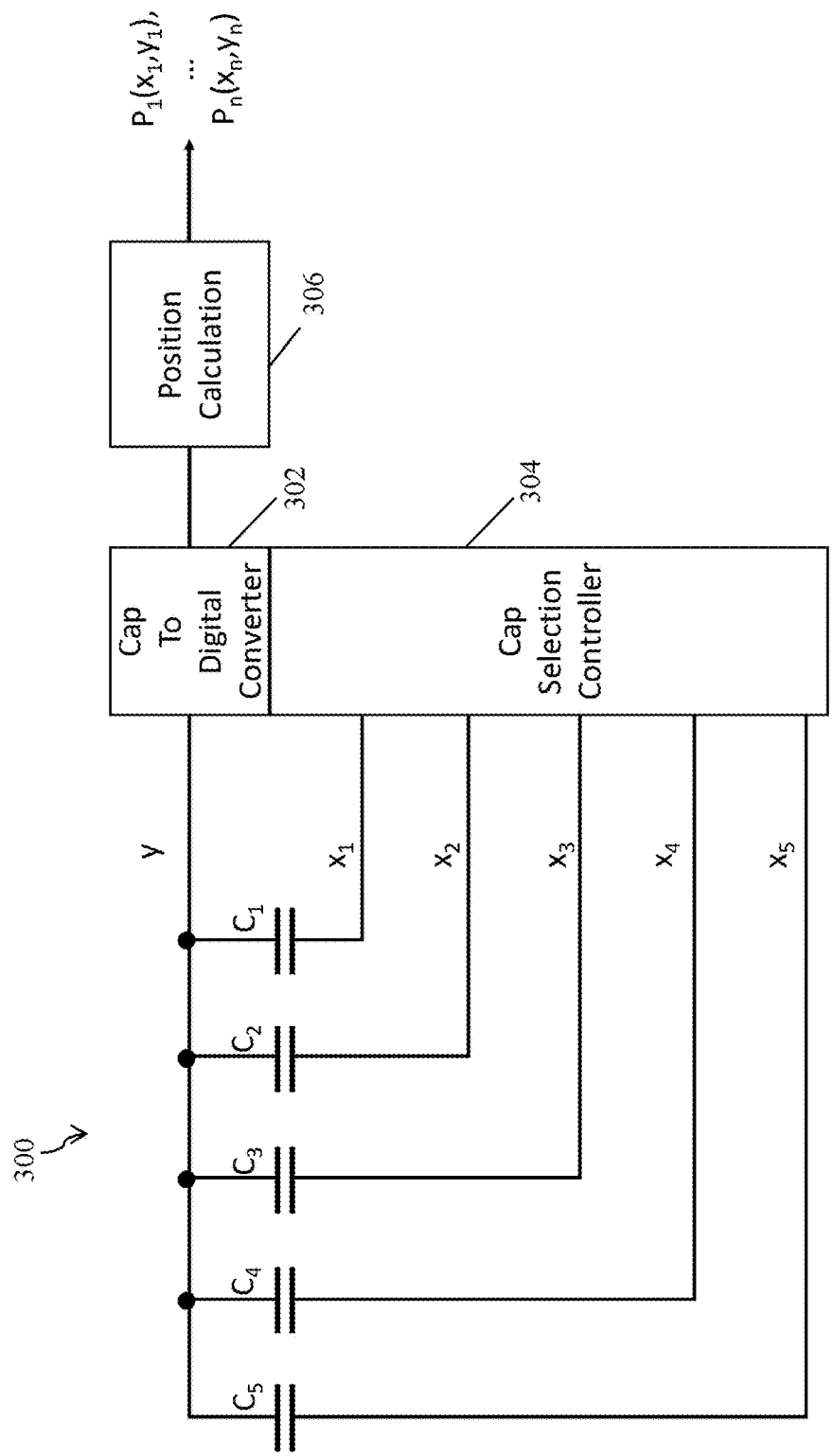
FIG. 3 shows another illustrative embodiment of a sensor system.

FIG. 3 shows another illustrative embodiment of a sensor system 300. The sensor system 300 comprises a plurality of capacitors C1 to C5 as shown in FIG. 2C. Furthermore, the sensor system 300 comprises a capacitance-to-digital converter 302 operatively coupled to said capacitors C1 to C5 via a y-connection. Furthermore, the sensor system 300 comprises a position calculation unit 306 operatively coupled to the capacitance-to-digital converter 302. Also, the sensor system 300 comprises a capacitor selection controller operatively coupled to the capacitors C1 to C5. The capacitance-to-digital converter 302 and the capacitor selection controller 304 may together be referred to as a sensing unit. The position calculation unit 306 may be utilized to evaluate the individual capacitances of the sensor capacitors C1 to C5. A change of the individual capacitances over time may be indicative of the presence of a finger near the corresponding capacitor; in other words, changes of the individual capacitances may be indicative of touch events at the locations of the sensor capacitors in the array. Likewise, changes in accumulated capacitances (e.g., the combined capacitance of capacitors C1 and C2) may be indicative of touch events at the location of these capacitors in the array. The capacitance-to-digital converter 302 and the capacitor selection controller 304 may be implemented as a computer program executed on a microcontroller unit (MCU).

Figure 4:
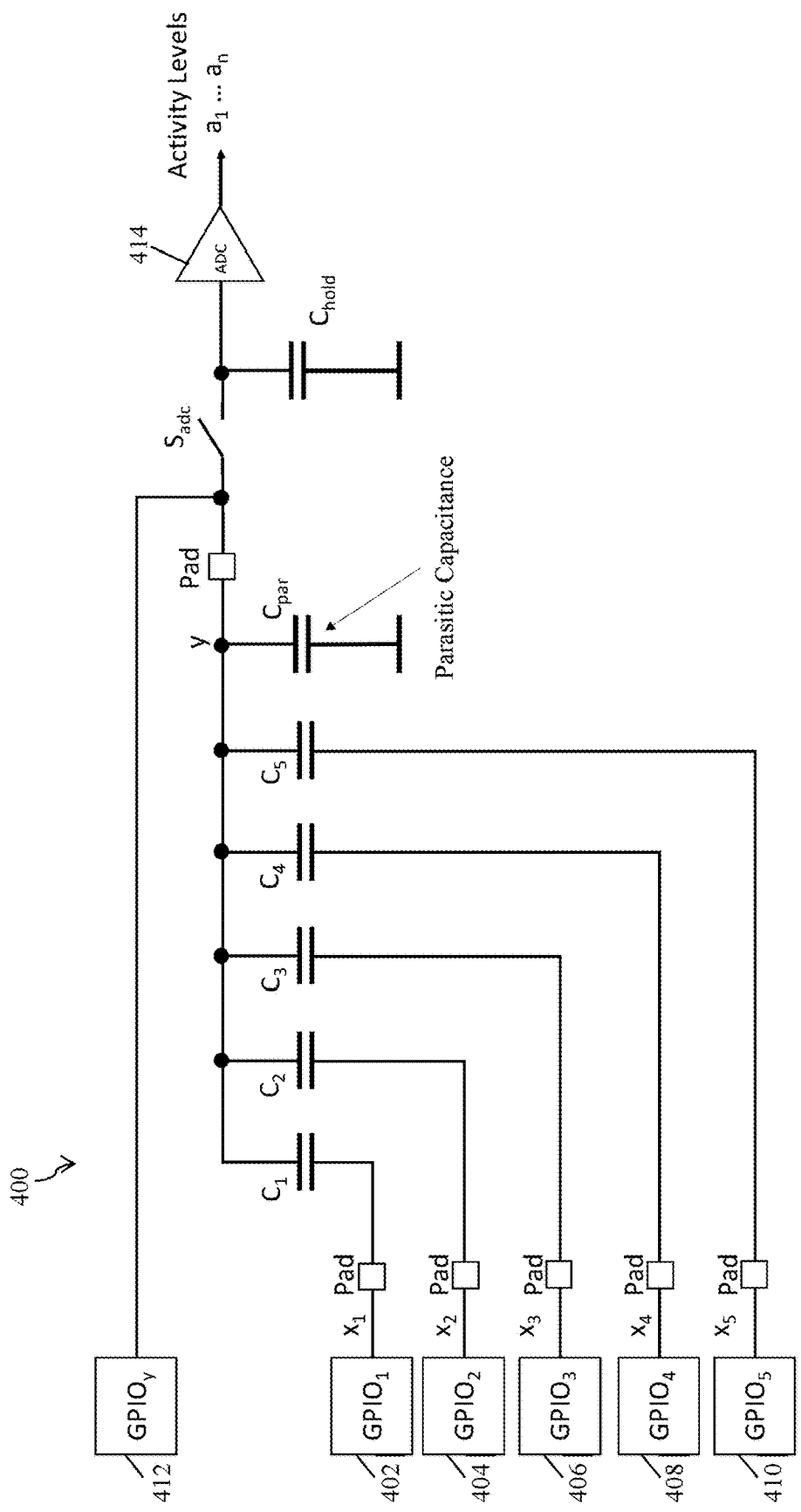
FIG. 4 shows a further illustrative embodiment of a sensor system.

FIG. 4 shows a further illustrative embodiment of a sensor system 400. As mentioned above, the capacitance-to-digital converter 302 and the capacitor selection controller 304 may be implemented as a computer program executed on a microcontroller unit (MCU). In this example, the computer program uses a plurality of general-purpose input/output pins (GPIOs) 402, 404, 406, 408, 410, 412 as switching elements. The purpose of the capacitance-to-digital converter 302 is to connect under control of said computer program one first electrode (x-electrode) of at least two sensor capacitors to a reference potential that may have a voltage of e.g. 0V. To do so, the capacitor selection controller 304 may be configured to group at least two sensing capacitances for concurrent capacitance evaluation by connecting said first electrode of at least two sensor capacitors to said reference potential. All second electrodes of said at least two sensor capacitors are connected to one node y. An analog-to-digital converter (ADC) 414 in conjunction with a sample & hold circuit may be utilized to measure the capacitance between node y and said reference potential of said at least two sensor capacitors in one processing step. This processing step amounts to a specific implementation of sampling the sensor capacitors concurrently. The measured accumulated capacitance of the at least two sensor capacitors may be indicative for the level of engagement of a finger with said sensor capacitors. The measurement result may be converted into a digital representation to make it machine-readable.

The presently disclosed method may be used to reduce the so-called position noise. One root cause for position noise is a reduced sensitivity of the sensor capacitors. Since a main portion of the sensor capacitors is provided by fringe field capacitance this part will significantly reduce if an insulation layer is positioned between the sensor capacitors and a finger. By measuring the capacitance of two or more sensor capacitors concurrently, the ratio of the measured capacitance to the parasitic capacitance present at node y may be increased. Thus, the sensitivity may be increased. The level of engagement of a finger with one individual sensor capacitor will further on be referred to as activity level "a" of that sensor capacitor. Sensing multiple sensor capacitances concurrently may yield to a good approximation the sum of the activity levels of the individual sensor capacitors. For good noise suppression, it is desired to make this sum of activity levels large. This sum of activity levels of at least two sensor capacitors will further be referred to as the total activity level of said sensor capacitors.

Furthermore, the presently disclosed method, which includes identifying and sequentially stepping through sets and subsets of the sensor capacitors, makes the position capturing process faster. In particular, a sequence of processing steps is disclosed that allows higher position sample rates. This, in turn, facilitates reducing the power consumption of the sensor system.

Figure 5:
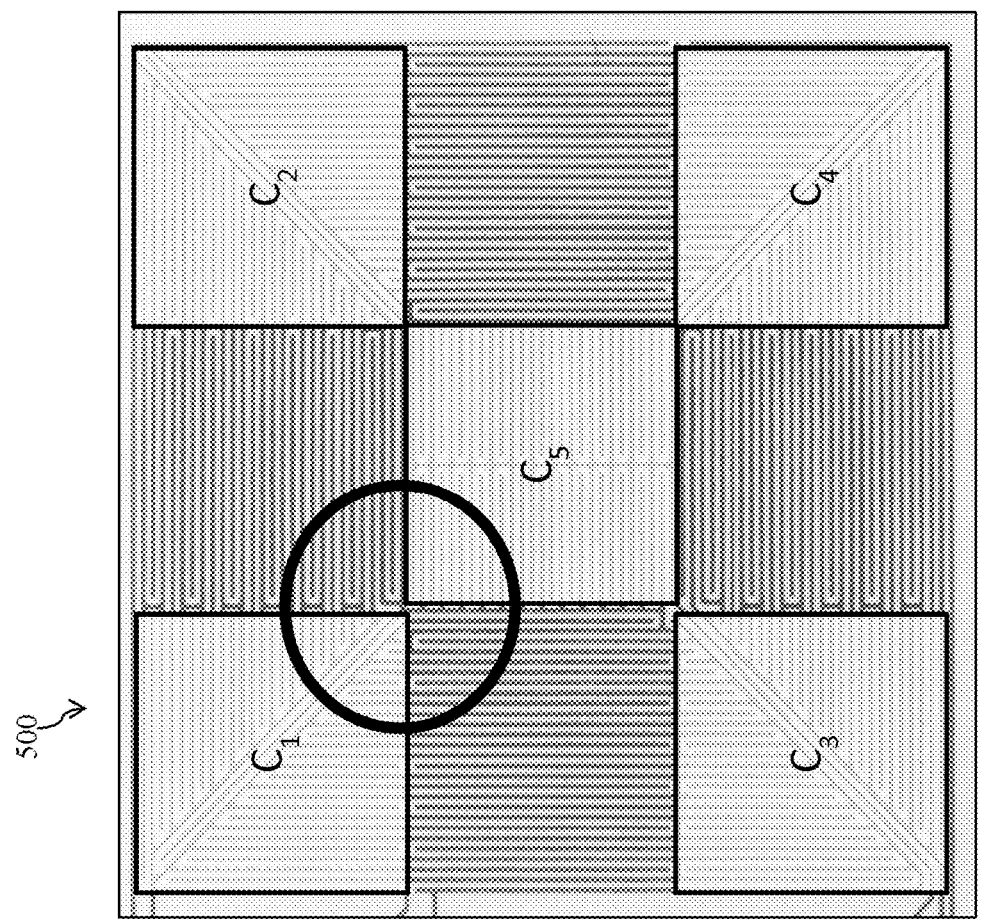
FIG. 5 shows an example of a sensor that is touched.

FIG. 5 shows an example of a sensor 500 that is touched. The calculation of the position where a finger may touch a two-dimensional capacitive sensor array (touchpad) may require the activity levels of a plurality of sensor capacitors to be evaluated. As shown in FIG. 5 the size of a fingertip may be small compared to the size of the touchpad. This means that the finger may only engage with a subset of all sensor capacitors, for example with the subset {C1, C2, C5}. Thus, in this example, not more than three sensor capacitors contribute significantly to the total activity level. If the finger directly touches one sensor capacitor it may cause a total activity level that is mainly determined by said directly touched sensor capacitor. If one of the sensor capacitors C3 and C4 is evaluated together with the capacitors C1, C2, C5, it may not or only marginally contribute to the total activity level. In case of 4-out-of-5 capacitors the significance of the touched sensor capacitor may be 25% to a good approximation (one out of the four being concurrently evaluated). For position noise reduction, it is important to improve the significance of those sensor capacitors that mainly contribute to position calculation. The presently disclosed method facilitates reducing the number of concurrently evaluated sensor capacitors while still maintaining noise filtering capability. In the example shown in FIG. 6, the number of concurrently evaluated sensor capacitors is reduced to two, which results in a sampling scheme with 2-out-of-3 sensor capacitors.

Figure 6:
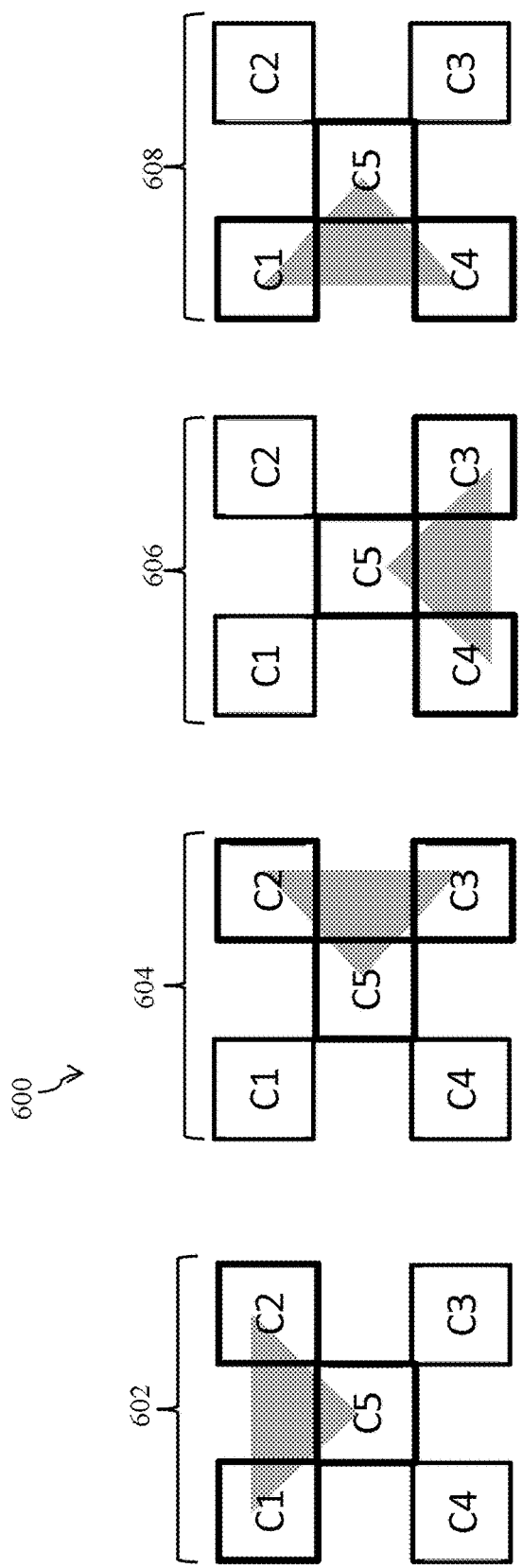
FIG. 6 shows another illustrative embodiment of a sensing method.

FIG. 6 shows another illustrative embodiment of a sensing method 600. The method comprises identifying a first set 602 of sensor capacitors {C1, C2, C5}, a second set 604 of sensor capacitors {C2, C3, C5}, a third set 606 of sensor capacitors {C3, C4, C5}, and a fourth set 608 of sensor capacitors {C1, C4, C5}. The sets 602, 604, 606, 608 are mutually different sets. The method 600 comprises stepping sequentially through the sets 602, 604, 606, 608. In this example, N=5 and M=3. Thus, a two-dimensional sensor array is shown having five sensor capacitors. For sampling all sensor capacitors, a rotating 2-out-of-3 sampling scheme may be applied to this array. The five sensor capacitors may in this embodiment be sampled by four sampling sequences with a 2-out-of-3 sampling scheme each. In other words, the method 600 steps sequentially through the sets 602, 604, 606, 608, and for each set (that contains 3 sensor capacitors), a 2-out-of-3 sampling scheme is applied. These sampling schemes also comprise a sequence, more specifically a sequence through mutually different subsets of each set: each subset contains 2 sensor capacitors that are sampled concurrently. In an illustrative way, this sequence may be regarded as a triangle rotating around the center sensor capacitor, similar to a rotating windmill rotor. More details of the method 600 are described with reference to FIG. 7.

Figure 7:
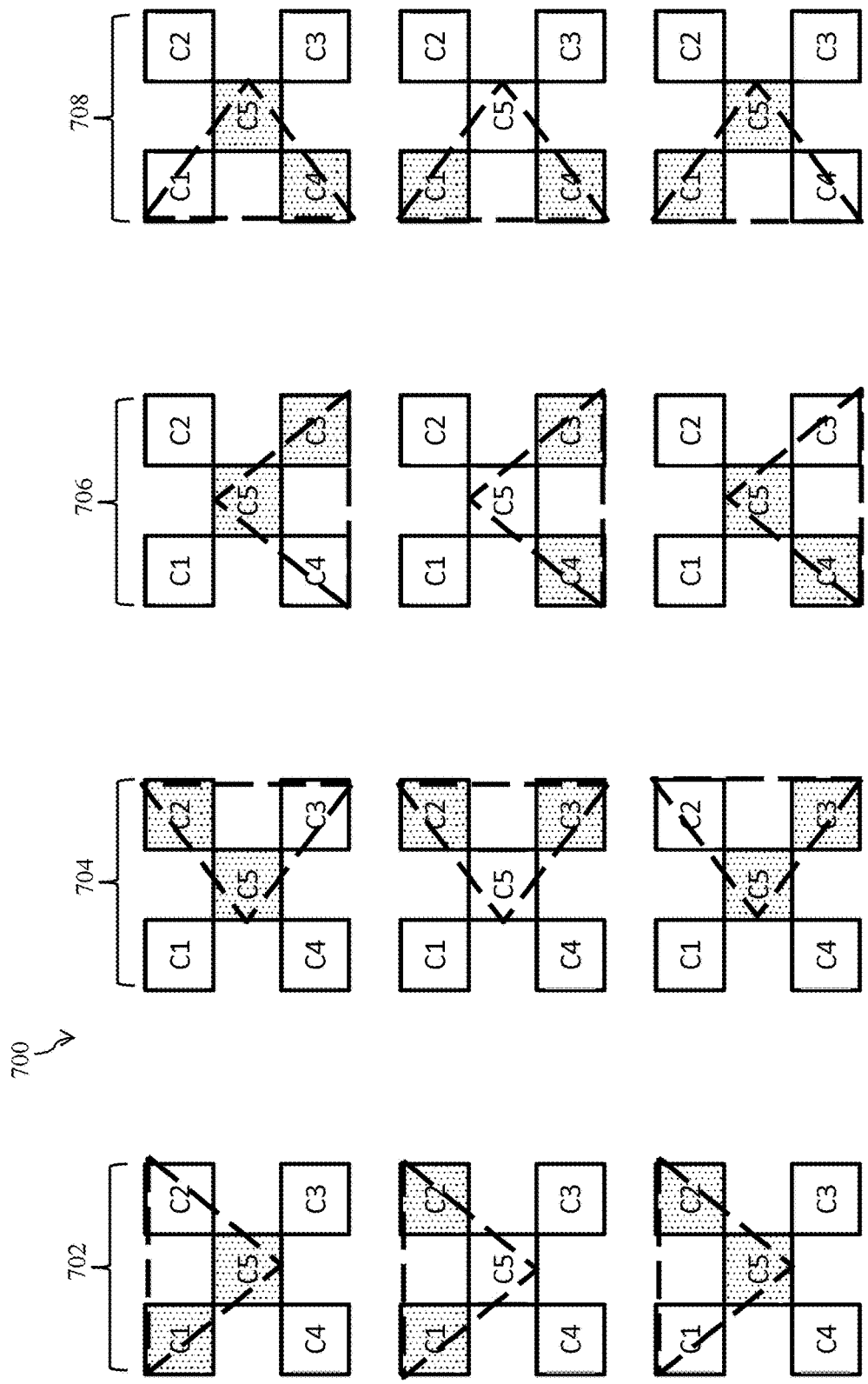
FIG. 7 shows a further illustrative embodiment of a sensing method.

FIG. 7 shows a further illustrative embodiment of a sensing method 700. Column 702 shows the different subsets within the first set 602, column 704 shows the different subsets within the second set 604, column 706 shows the different subsets within the third set 606, and column 708 shows the different subsets within the fourth set 608. Thus, in this example, the different sets 602, 604, 606, 608 are identified, and set 602 is the first set that is processed. Then, subsets {C1, C5}, {C1, C2} and {C2, C5} are identified in the first set 602, and subset {C1, C5} is the first subset that is processed. The sensor capacitors C1 and C5 (i.e., the capacitors of the subset {C1, C5} of set {C1, C2, C5} are sampled concurrently and the resulting capacitance may be captured (e.g., by the above-mentioned capacitance-to-digital converter 302). Next, the capacitors of subset {C1, C2} are sampled concurrently and the resulting capacitance captured, and then the capacitors of subset {C2, C5} are sampled concurrently and the resulting capacitance captured. Subsequently, similar steps are performed for the sets

604, 606, 608. Thus, FIG. 7 shows a complete sampling sequence. The four columns 702, 704, 706, 708, from left to right indicate the four sampling sequences of 2-out-of-3.

Figure 8:
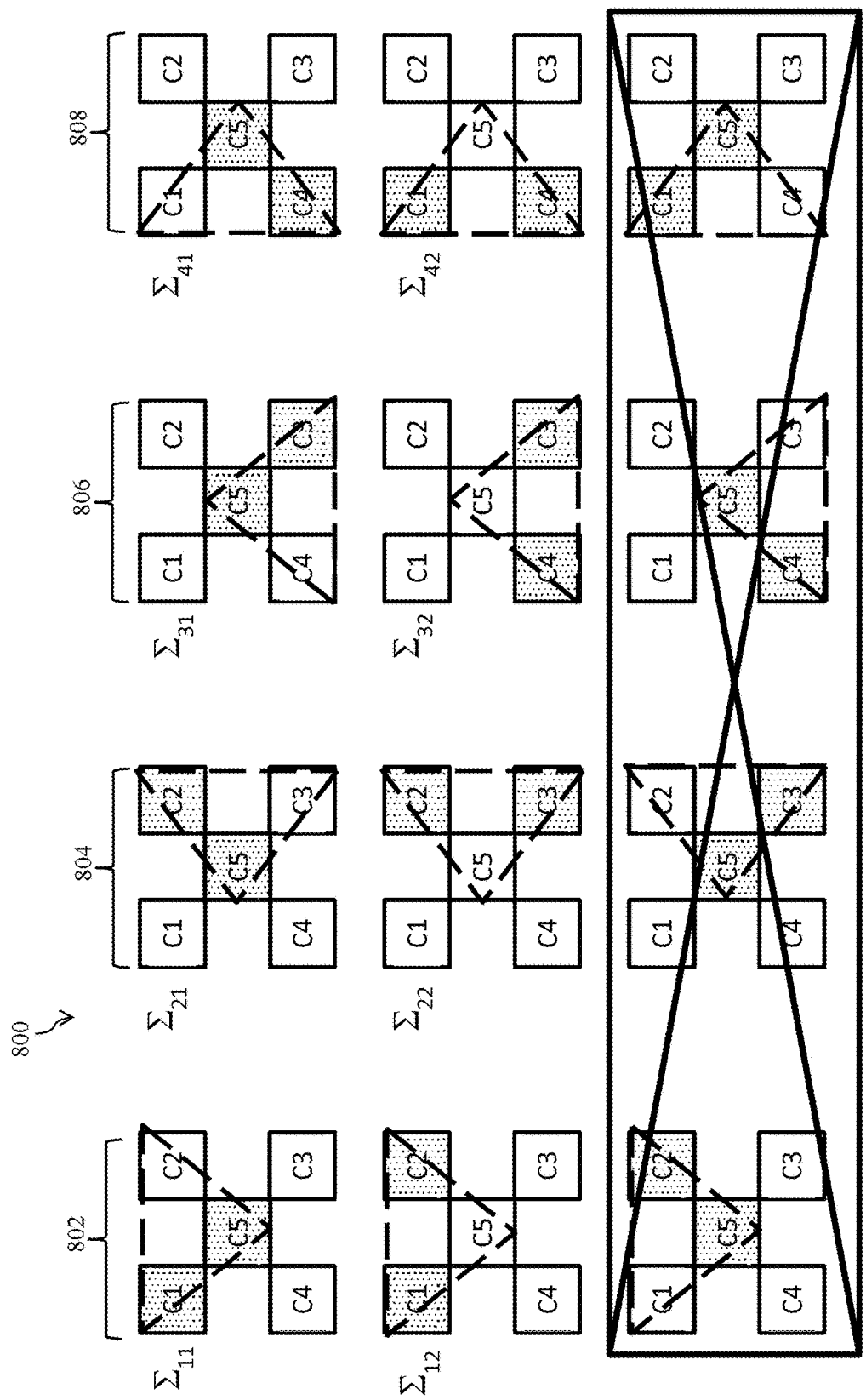
FIG. 8 shows a further illustrative embodiment of a sensing method.

FIG. 8 shows a further illustrative embodiment of a sensing method 800. In one or more embodiments, the processing unit is further configured to identify and skip redundant subset steps. In this way, the total sampling time may be reduced further, which in turn further reduces the power consumption. The inventor has realized that in a configuration wherein N=5 and M=3, and wherein each subset comprises (M-1)=2 sensor elements (sensor capacitors), a significant part of the subset steps is redundant. As shown in FIG. 8, the sampling combinations in row three are redundant to the sampling combinations comprised in row one, and may therefore be skipped. The remaining sampling combinations (i.e. the sampled subsets) yield capacitance values that are referred to as sum values $\Sigma_{11}, \Sigma_{21}, \Sigma_{31}, \Sigma_{41}, \Sigma_{12}, \Sigma_{11}, \Sigma_{32}$, and $\Sigma_{42}$. The individual activity levels of sensor capacitors may be derived from these sum values by means of a calculation. Looking at the left column 802 as an example, the individual activity levels may be derived from one single 2-out-of-3 sampling sequence comprising three scans, as shown in Table 1.

TABLE 1

| Scan | $C_1$ | $C_2$ | $C_3$ | $C_4$ | $C_5$ | Total Activity Level |
|---|---|---|---|---|---|---|
| 1.1 | $a_1$ | | | | $a_5$ | $\Sigma_{11} = a_1 + 0 + 0 + 0 + a_5$ |
| 1.2 | $a_1$ | $a_2$ | | | | $\Sigma_{12} = a_1 + a_2 + 0 + 0 + 0$ |
| 2.1 | | $a_2$ | | | $a_5$ | $\Sigma_{21} = 0 + a_2 + 0 + 0 + a_5$ |
| Total | $2 * a_1$ | $2 * a_2$ | | | $2 * a_5$ | $\Sigma = 2 * a_1 + 2 * a_2 + 2 * a_5$ |
| | | | | | | $2 * a_1 = \Sigma - 2 * \Sigma_{11}$ |
| | | | | | | $2 * a_2 = \Sigma - 2 * \Sigma_{12}$ |
| | | | | | | $2 * a_5 = \Sigma - 2 * \Sigma_{21}$ |

Skipping the redundant total activity samples of row 3 in Fig. may yield the total activity levels shown in Table 2.

TABLE 2

| Scan | Scan Weight | $C_1$ | $C_2$ | $C_3$ | $C_4$ | $C_5$ | Total Activity Level |
|---|---|---|---|---|---|---|---|
| 1.2 | 2 | X | | | | X | $\Sigma_{11} = a_1 + 0 + 0 + 0 + a_5$ |
| 1.2 | 1 | X | X | | | | $\Sigma_{12} = a_1 + a_2 + 0 + 0 + 0$ |
| 2.1 | 2 | | X | | | X | $\Sigma_{21} = 0 + a_2 + 0 + 0 + a_5$ |
| 2.2 | 1 | | X | X | | | $\Sigma_{22} = 0 + a_2 + a_3 + 0 + 0$ |
| 3.1 | 2 | | | X | | X | $\Sigma_{31} = 0 + 0 + a_3 + 0 + a_5$ |
| 3.2 | 1 | | | X | X | | $\Sigma_{32} = 0 + 0 + a_3 + a_4 + 0$ |
| 4.1 | 2 | | | | X | X | $\Sigma_{41} = 0 + 0 + 0 + a_4 + a_5$ |
| 4.2 | 1 | X | | | X | | $\Sigma_{42} = a_1 + 0 + 0 + a_4 + 0$ |

The activity levels a1 to a5 associated with individual sensor capacitors C1 to C5 may be obtained by calculation from the total activity levels $\Sigma_{ij}$. A center-of-gravity algorithm may be applied to the sensor-capacitor related activity levels for the calculation of x- and y-position components; such a center-of-gravity algorithm is known as such. It is noted that the sequence of the scanning steps may be altered by the skilled person.

FIG. 9 shows a schematic sensor capacitor arrangement 900. As shown in FIG. 9 separate position weights $Wx_i$ for x and $Wy_i$ for y may be applied to the activity levels $a_1$ to $a_5$ of the sensor capacitors $C_1$ to $C_5$. Applying a center-of-gravity calculation to the individual activity levels a1 to a5 may yield the x- and y-position components $Pos_x$ and $Pos_y$ as indicated below:

$$Pos_x = \Sigma a_i * Wx_i / \Sigma a_i$$

for i=1 . . . 5, wherein $a_i$ represents the activity level of sensor capacitor $C_i$ $$Pos_y = \Sigma a_i * Wy_i / \Sigma a_i$$

for i=1 . . . 5, wherein $a_i$ represents the activity level of sensor capacitor $C_i$ The double individual activity levels ($2*a_i$) may be calculated from the total activity levels as shown in Table 3. This calculation is referenced by further calculations.

TABLE 3

| Scan | | | Total Activity Level | | |
|---|---|---|---|---|---|
| | $\Sigma_1$ | = | $\Sigma_{11} + \Sigma_{12} + \Sigma_{21}$ | = | |
| 2.1 | $2* a_1$ | = | $\Sigma_1 - 2 * \Sigma_{21}$ | = | $\Sigma_{11} + \Sigma_{12} - \Sigma_{21}$ |
| 1.1 | $2* a_2$ | = | $\Sigma_1 - 2 * \Sigma_{11}$ | = | $\Sigma_{12} + \Sigma_{21} - \Sigma_{11}$ |
| 1.2 | $2* a_5$ | = | $\Sigma_1 - 2 * \Sigma_{12}$ | = | $\Sigma_{11} + \Sigma_{21} - \Sigma_{12}$ |
| | $\Sigma_2$ | = | $\Sigma_{21} + \Sigma_{22} + \Sigma_{31}$ | | |
| 3.1 | $2* a_2$ | = | $\Sigma_2 - 2 * \Sigma_{31}$ | = | $\Sigma_{21} + \Sigma_{22} - \Sigma_{31}$ |
| 2.1 | $2* a_3$ | = | $\Sigma_2 - 2 * \Sigma_{21}$ | = | $\Sigma_{22} + \Sigma_{31} - \Sigma_{21}$ |
| 2.2 | $2* a_5$ | = | $\Sigma_2 - 2 * \Sigma_{22}$ | = | $\Sigma_{21} + \Sigma_{31} - \Sigma_{22}$ |
| | $\Sigma_3$ | = | $\Sigma_{31} + \Sigma_{32} + \Sigma_{41}$ | | |
| 4.1 | $2* a_3$ | = | $\Sigma_3 - 2 * \Sigma_{41}$ | = | $\Sigma_{31} + \Sigma_{32} - \Sigma_{41}$ |
| 3.1 | $2* a_4$ | = | $\Sigma_3 - 2 * \Sigma_{31}$ | = | $\Sigma_{32} + \Sigma_{41} - \Sigma_{31}$ |
| 3.2 | $2* a_5$ | = | $\Sigma_3 - 2 * \Sigma_{32}$ | = | $\Sigma_{31} + \Sigma_{41} - \Sigma_{32}$ |
| | $\Sigma_4$ | = | $\Sigma_{41} + \Sigma_{42} + \Sigma_{11}$ | | |
| 4.1 | $2* a_1$ | = | $\Sigma_4 - 2 * \Sigma_{41}$ | = | $\Sigma_{42} + \Sigma_{11} - \Sigma_{41}$ |
| 1.1 | $2* a_4$ | = | $\Sigma_4 - 2 * \Sigma_{11}$ | = | $\Sigma_{41} + \Sigma_{42} - \Sigma_{11}$ |
| 4.2 | $2* a_5$ | = | $\Sigma_4 - 2 * \Sigma_{42}$ | = | $\Sigma_{41} + \Sigma_{11} - \Sigma_{42}$ |

The sum of all unweighted activity levels $\Sigma_a$ may be calculated as:

$$2*\Sigma_a = 2*a_1 + 2*a_2 + 2*a_3 + 2*a_4 + 2*a_5$$

Applying the double activity levels of Table 3 yields:

$$2*a_1 = \Sigma_{42} + \Sigma_{11} - \Sigma_{41}$$

$$2*a_2 = \Sigma_{12} + \Sigma_{21} - \Sigma_{11}$$

$$2*a_3 = \Sigma_{22} + \Sigma_{31} - \Sigma_{21}$$

$$2*a_4 = \Sigma_{32} + \Sigma_{41} - \Sigma_{31}$$

$$2*a_5 = \Sigma_{41} + \Sigma_{11} - \Sigma_{42}$$

$$2*\Sigma_a = \Sigma_{42} + \Sigma_{11} - \Sigma_{41} + \Sigma_{12} + \Sigma_{21} - \Sigma_{11} + \Sigma_{22} + \Sigma_{31} - \Sigma_{21} + \Sigma_{32} + \Sigma_{41} - \Sigma_{31} + \Sigma_{41} + \Sigma_{11} - \Sigma_{42}$$

$$2*\Sigma_a = \Sigma_{11} + \Sigma_{12} + \Sigma_{22} + \Sigma_{32} + \Sigma_{41}$$

By application of the position weights shown in FIG. 9 the x-weighted activity level $\Sigma_{ax}$ may be calculated as:

$$2*\Sigma_{ax} = -2*a_1 + 2*a_2 + 2*a_3 - 2*a_4$$

Applying the double activity levels of Table 3 yields:

$$2*a_1 = -\Sigma_{42} - \Sigma_{11} + \Sigma_{41}$$

$$2*a_2 = -\Sigma_{21} - \Sigma_{22} + \Sigma_{31}$$

$$2*a_3 = -\Sigma_{22} - \Sigma_{31} + \Sigma_{21}$$

$$2*a_4 = -\Sigma_{41} - \Sigma_{42} + \Sigma_{11}$$

$$2*\Sigma_{ax} = -\Sigma_{42} - \Sigma_{11} + \Sigma_{41} + \Sigma_{21} + \Sigma_{22} - \Sigma_{31} + \Sigma_{21} - \Sigma_{41} - \Sigma_{42} + \Sigma_{11}$$

$$2*\Sigma_{ax} = 2*\Sigma_{22} - 2*\Sigma_{42}$$

$$\Sigma_{ax} = \Sigma_{22} - \Sigma_{42}$$

By application of the position weights shown in FIG. 9 the y-weighted activity level $\Sigma_{ay}$ may be calculated as:

$$2*\Sigma_{ay} = 2*a_1 + 2*a_2 - 2*a_3 - 2*a_4$$

Applying the double activity levels of Table 3 yields:

$$2*a_1 = -\Sigma_{11} + \Sigma_{12} - \Sigma_{21}$$

$$2*a_2 = -\Sigma_{12} + \Sigma_{21} - \Sigma_{11}$$

$$2*a_3 = -\Sigma_{31} + \Sigma_{32} - \Sigma_{41}$$

$$2*a_4 = -\Sigma_{32} + \Sigma_{41} - \Sigma_{31}$$

$$2*\Sigma_{ay} = \Sigma_{11} + \Sigma_{12} - \Sigma_{21} + \Sigma_{12} + \Sigma_{21} - \Sigma_{11} - \Sigma_{31} - \Sigma_{32} + \Sigma_{41} - \Sigma_{32} - \Sigma_{41} + \Sigma_{31}$$

$$2*\Sigma_{ay} = 2*\Sigma_{12} - 2*\Sigma_{32}$$

$$\Sigma_{ay} = \Sigma_{12} - \Sigma_{32}$$

TABLE 4

| Scan | $C_1$ | $C_2$ | $C_3$ | $C_4$ | $C_5$ | Total Activity Level |
|---|---|---|---|---|---|---|
| 1.1 | X |   |   |   | X | $\Sigma_{11} = a_1 + 0 + 0 + 0 + a_5$ |
| 1.2 | X | X |   |   |   | $\Sigma_{12} = a_1 + a_2 + 0 + 0 + 0$ |
| ~~2.1~~ |   | ~~X~~ |   |   | ~~X~~ | ~~$\Sigma_{21} = 0 + a_2 + 0 + 0 + a_5$~~ |
| 2.2 |   | X | X |   |   | $\Sigma_{22} = 0 + a_2 + a_3 + 0 + 0$ |
| ~~3.1~~ |   |   | ~~X~~ |   | ~~X~~ | ~~$\Sigma_{31} = 0 + 0 + a_3 + 0 + a_5$~~ |
| 3.2 |   |   | X | X |   | $\Sigma_{32} = 0 + 0 + a_3 + a_4 + 0$ |
| 4.1 |   |   |   | X | X | $\Sigma_{41} = 0 + 0 + 0 + a_4 + a_5$ |
| 4.2 | X |   |   | X |   | $\Sigma_{42} = a_1 + 0 + 0 + a_4 + 0$ |
|   |   |   |   |   |   | $2 * \Sigma_a = \Sigma_{11} + \Sigma_{12} + \Sigma_{22} + \Sigma_{32} + \Sigma_{41}$ |
|   |   |   |   |   |   | $\Sigma_{ax} = \Sigma_{22} - \Sigma_{42}$ |
|   |   |   |   |   |   | $\Sigma_{ay} = \Sigma_{12} - \Sigma_{32}$ |

Figure 10:
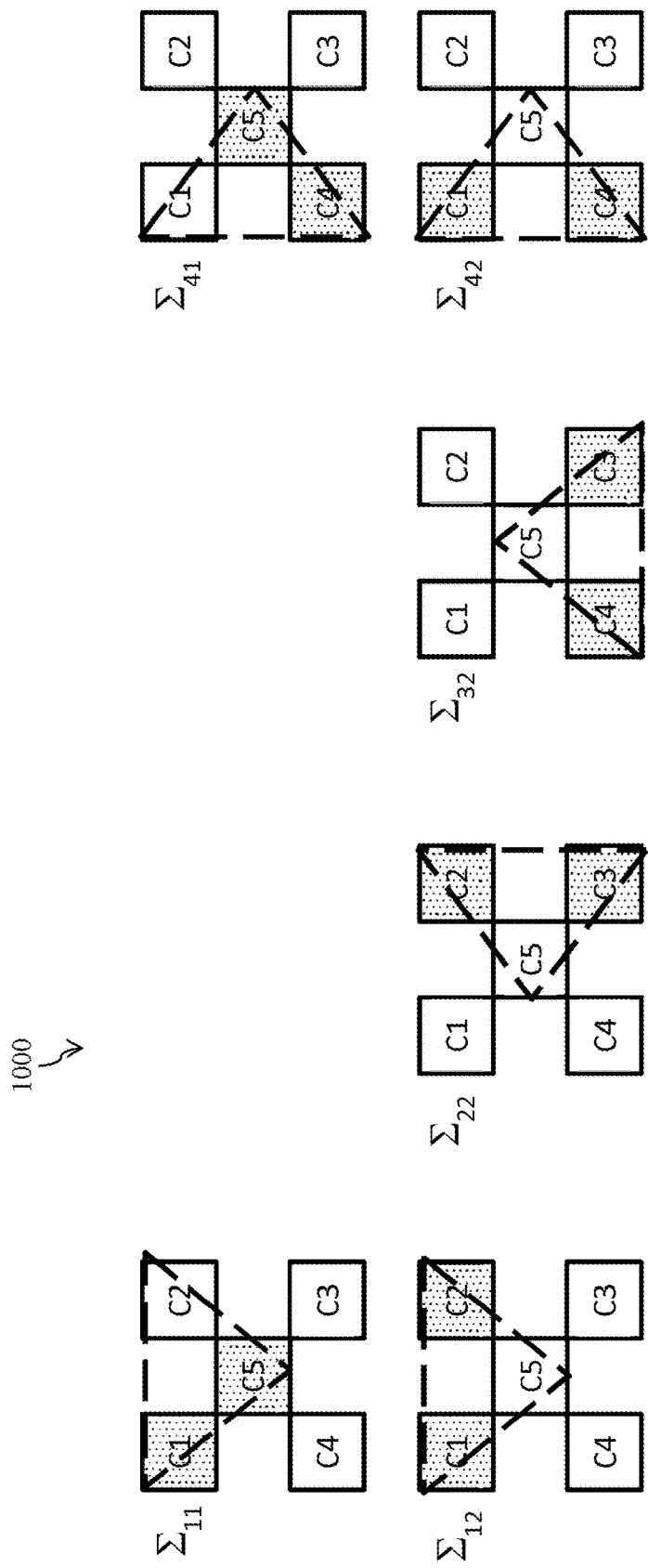
FIG. 10 shows an illustrative embodiment of specific scan steps.

The relationship between activity levels $a_i$, total activity levels $\Sigma_{ij}$, unweighted activity levels $\Sigma_a$, y-weighted activity level $\Sigma_{ax}$, y-weighted activity level $\Sigma_{ay}$ is summarized in Table 4. In some embodiments, the scan steps 2.1 and 3.1 shown in Table 4 may be skipped as the total activity levels provided by these steps do not contribute to unweighted activity levels $\Sigma_a$, y-weighted activity level $\Sigma_{ax}$ or y-weighted activity level $\Sigma_{ay}$. By skipping these scan steps the position acquisition time may be further improved by approximately 20%. FIG. 10 shows the scan steps that may be required to calculate the position information.

The two-dimensional position components may be calculated as:

$$Pos_x = 2*\Sigma_{ax}/2*\Sigma_a = 2*(\Sigma_{22} - \Sigma_{42})/(\Sigma_{11} + \Sigma_{12} + \Sigma_{22} + \Sigma_{32} + \Sigma_{41})$$

$$Pos_y = 2*\Sigma_{ay}/2*\Sigma_a = 2*(\Sigma_{12} - \Sigma_{32})/(\Sigma_{11} + \Sigma_{12} + \Sigma_{22} + \Sigma_{32} + \Sigma_{41})$$

Figure 11:
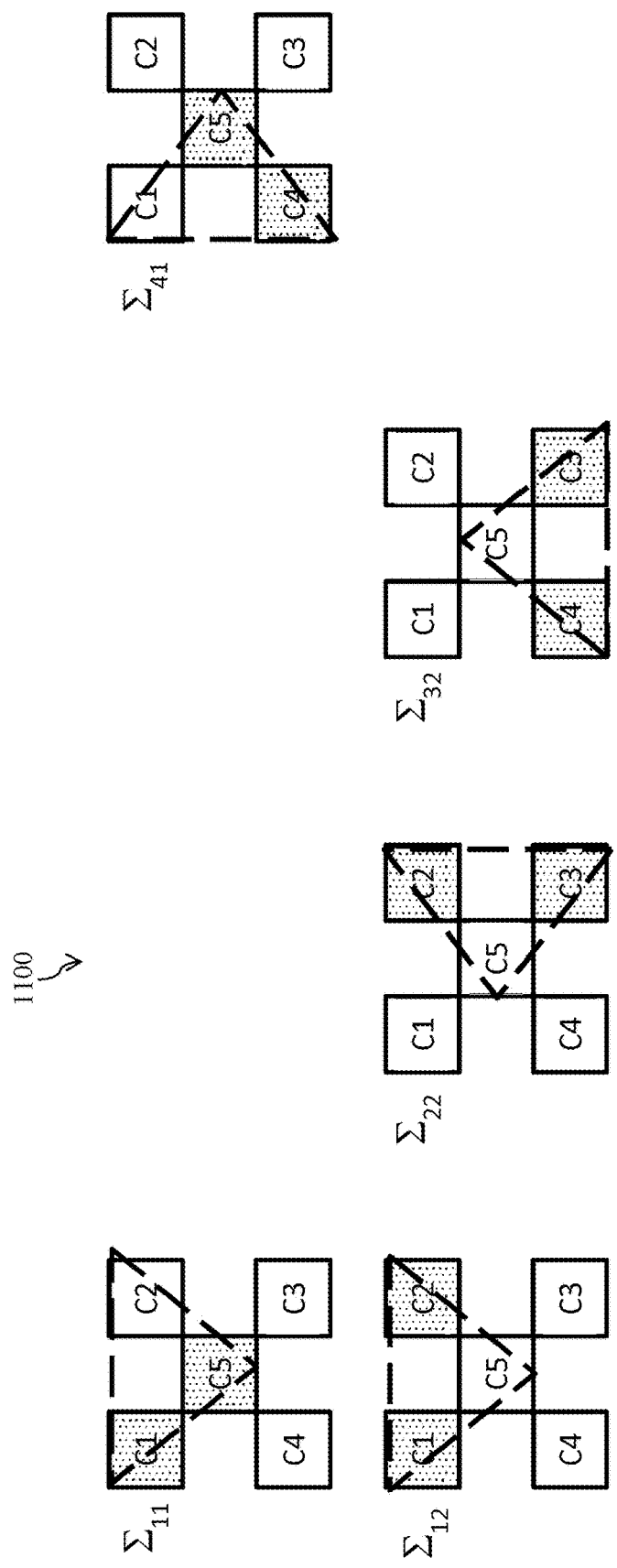
FIG. 11 shows another illustrative embodiment of specific scan steps.

Two divisions and a few subtractions/additions may be required to obtain one x/y-position sample from the position components. The denominator-term may comprise the scan steps shown in FIG. 11. Said denominator term ($\Sigma_{11} + \Sigma_{12} + \Sigma_{22} + \Sigma_{32} + \Sigma_{41}$) may exhibit a low-pass-filter characteristic that may further add to position smoothing. This term may also determine the position gain (elongation from grid centre) when calculating the position components.

Figure 12:
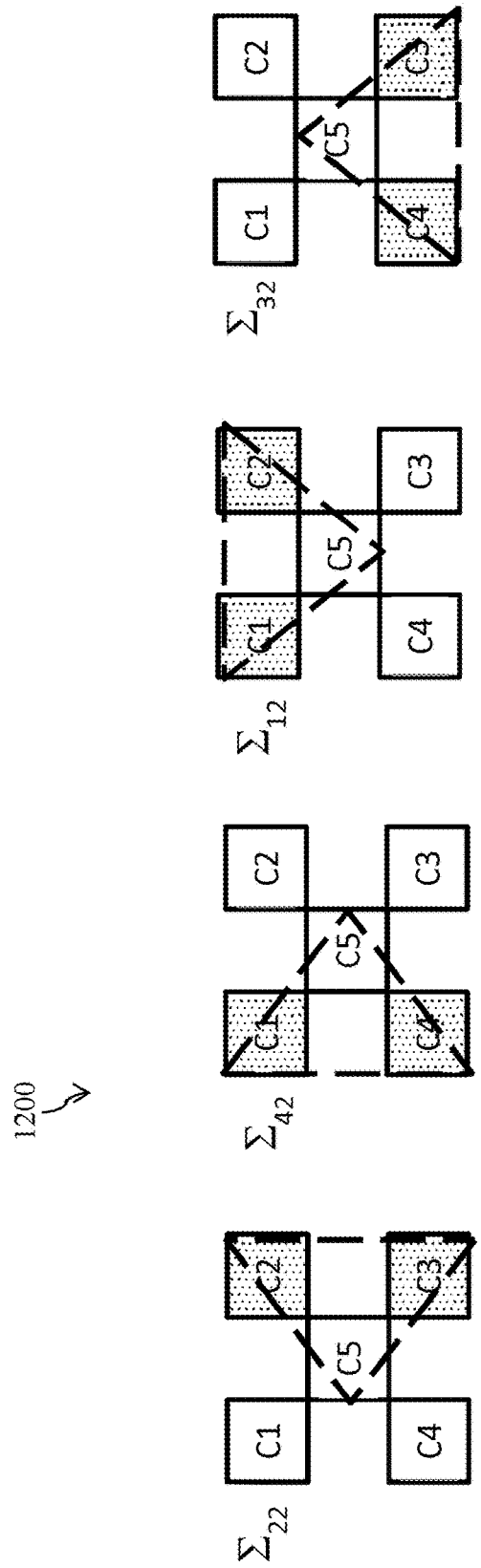
FIG. 12 shows a further illustrative embodiment of specific scan steps.

The presently disclosed method facilitates achieving that the calculation of $Pos_x$ is made mainly dependent on the term ($\Sigma_{22} - \Sigma_{42}$) and that the calculation of $Pos_y$ is made mainly dependent on the term ($\Sigma_{12} - \Sigma_{32}$). The aforementioned total activity levels $\Sigma_{22}$, $\Sigma_{42}$, $\Sigma_{12}$ and $\Sigma_{32}$ are shown in FIG. 12. The main position components ($\Sigma_{22} - \Sigma_{42}$) and ($\Sigma_{12} - \Sigma_{32}$) exhibit a high-pass-filter behavior. The presently disclosed method facilitates achieving that these high-pass filter terms remove DC-components like static position offsets from the x- and y-position components.

Figure 13:
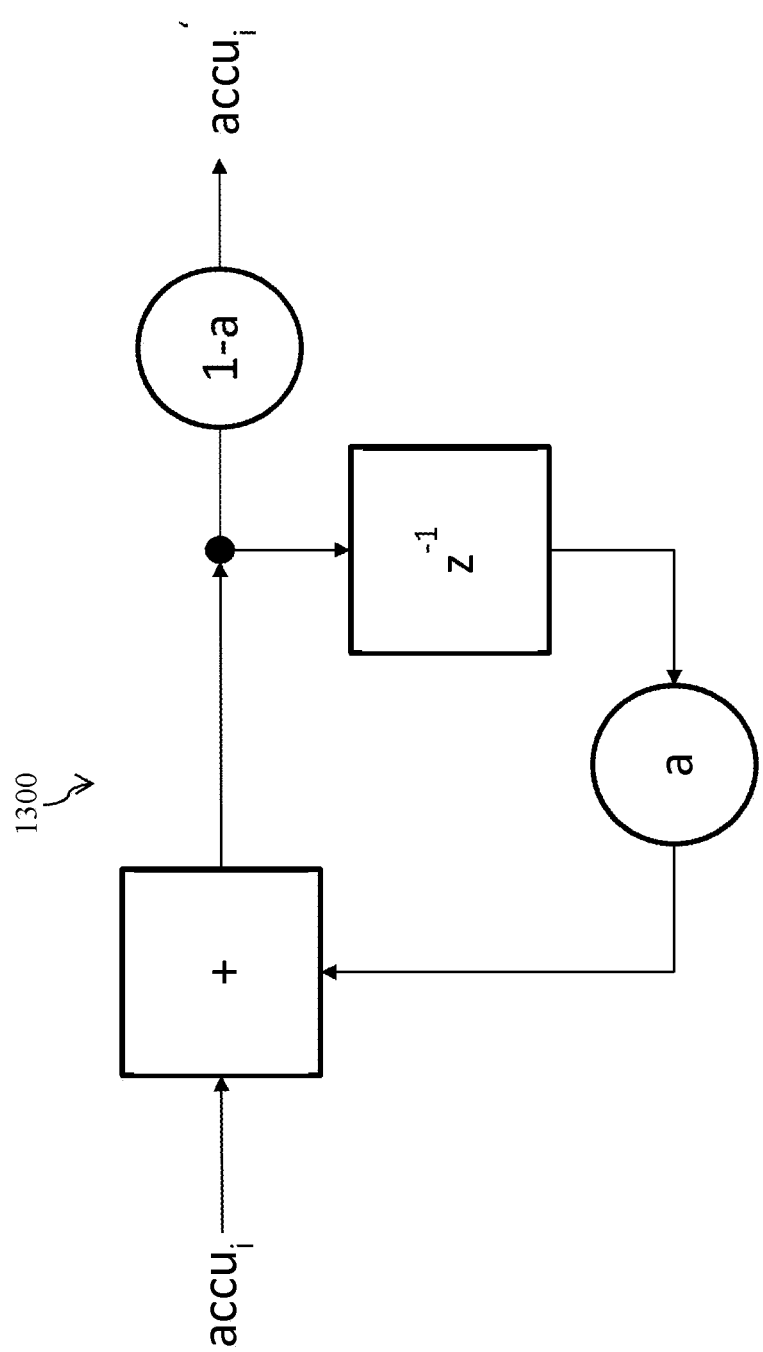
FIG. 13 shows an illustrative embodiment of a position component filter.

FIG. 13 shows an illustrative embodiment of a position component filter 1300. In some embodiments, the position components may be filtered before calculating the x- and y-position by weighted averaging (center of gravity), as shown in FIG. 3. This may provide the advantage of filtering the individual components ($2*\Sigma_a$), $\Sigma_{ax}$ and $\Sigma_{ay}$ by a low-pass filter that may be of an infinite impulse response (IIR) low-pass-filter type. The filter cut-off frequency may be controlled by the filter parameter a ($0 < a < 1$). The position components $\Sigma_n$ may be filtered as shown in FIG. 12. The example given here is only schematic. The advantage of an IIR filter is that it may be interleaved with the capacitance measuring processing steps in such a way that a filtered x/y-position sample is available after capturing all required total activity levels. The filter coefficient a of the recursive filter may in some embodiments be chosen as $0 < a < 1$. The filter coefficient a should not be smaller than 0 and should be smaller than 1. A filter coefficient of 0 may switch the filter off. The larger a becomes the longer the integration period will be (the lower the filter cut-off frequency will be). The gain correction coefficient ($1-a$) may correct the output gain for unity gain. Said gain correction coefficient may also be omitted if the output $accu_i'$ does not exceed the available numerical range.

Figure 14:
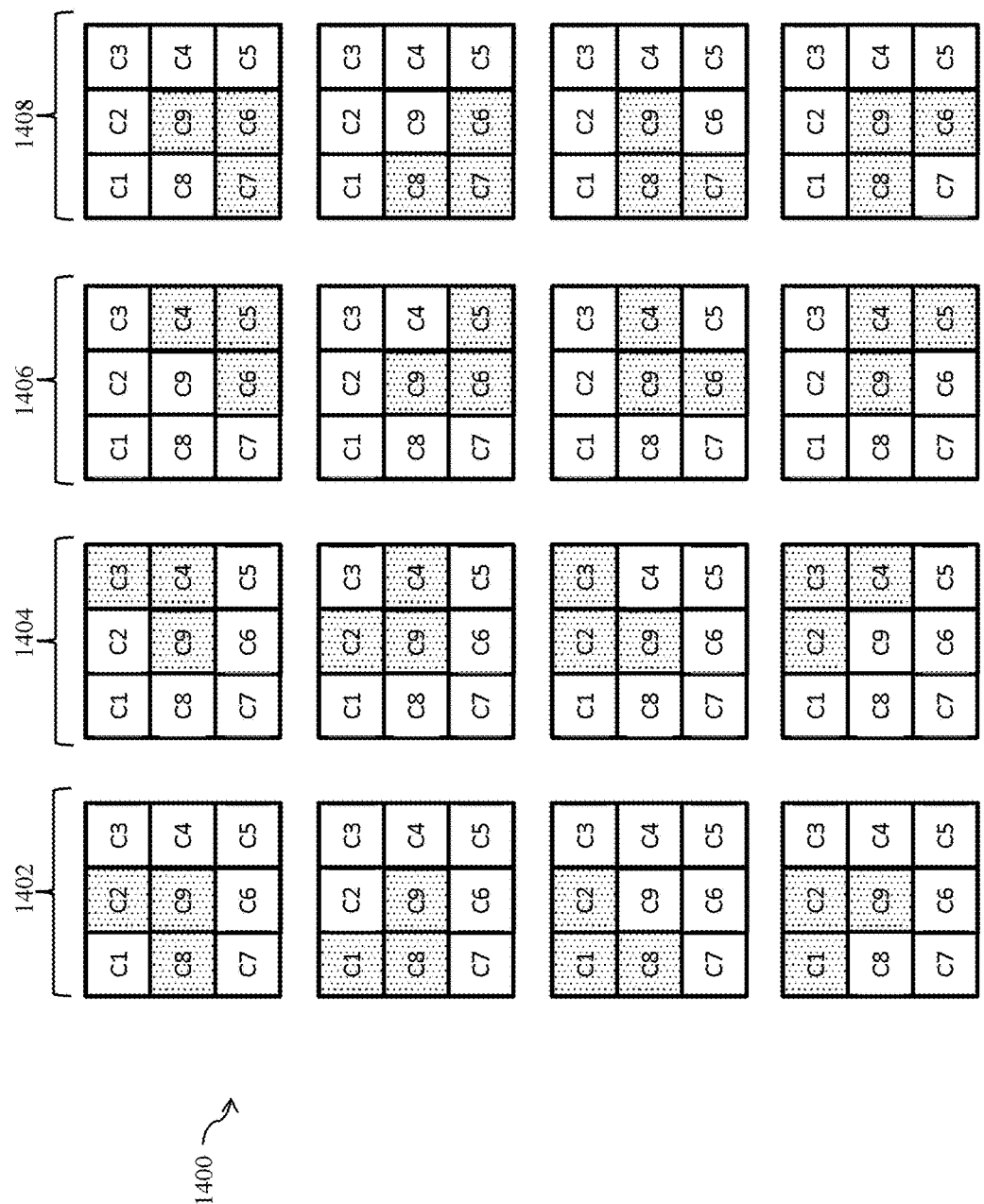
FIG. 14 shows a further illustrative embodiment of a sensing method.

FIG. 14 shows a further illustrative embodiment of a sensing method 1400. The method comprises identifying a first set of sensor capacitors {C1, C2, C8, C9}, a second set of sensor capacitors {C2, C3, C4, C8}, a third set of sensor capacitors {C4, C5, C6, C9}, and a fourth set of sensor capacitors {C6, C7, C8, C9}. The sets are mutually different sets. The method 1400 comprises stepping sequentially through these sets. In this example, N=9 and M=4. Thus, a two-dimensional sensor array is shown having nine sensor capacitors. The nine sensor capacitors may in this embodiment be sampled by four sampling sequences with a 3-out-of-4 sampling scheme each. In other words, the method 1400 steps sequentially through the sets, and for each set (that contains 4 sensor capacitors), a 3-out-of-4 sampling scheme is applied. These sampling schemes also comprise a sequence, more specifically a sequence through mutually different subsets of each set: each subset contains 3 sensor capacitors that are sampled concurrently. Column 1402 shows the different subsets within the first set, column 1404 shows the different subsets within the second set, column 1406 shows the different subsets within the third set, and column 1408 shows the different subsets within the fourth set. Thus, in this example, the different sets are identified, and then the first set is processed. Then, subsets {C2, C8, C9}, {C1, C8, C9}, {C1, C2, C8}, and {C1, C2, C9} are identified in the first set, and subset {C2, C8, C9} is the first subset that is processed. The sensor capacitors C2, C8, and C9 (i.e., the capacitors of the subset {C2, C8, C9} of set {C1, C2, C8, C9} are sampled concurrently and the resulting capacitance may be captured (e.g., by the above-mentioned capacitance-to-digital converter 302). Next, the capacitors of subset {C1, C8, C9} are sampled concurrently and the resulting capacitance captured, the capacitors of subset {C1, C2, C8} are sampled concurrently and the resulting capacitance captured, and then the capacitors of subset {C1, C2, C9} are sampled concurrently and the resulting capacitance captured. Subsequently, similar steps are performed for the other sets. Thus, FIG. 1400 shows a complete sampling sequence. The four columns 1402, 1404, 1406, 1408, from left to right indicate the four sampling sequences of 3-out-of-4.

Figure 15:
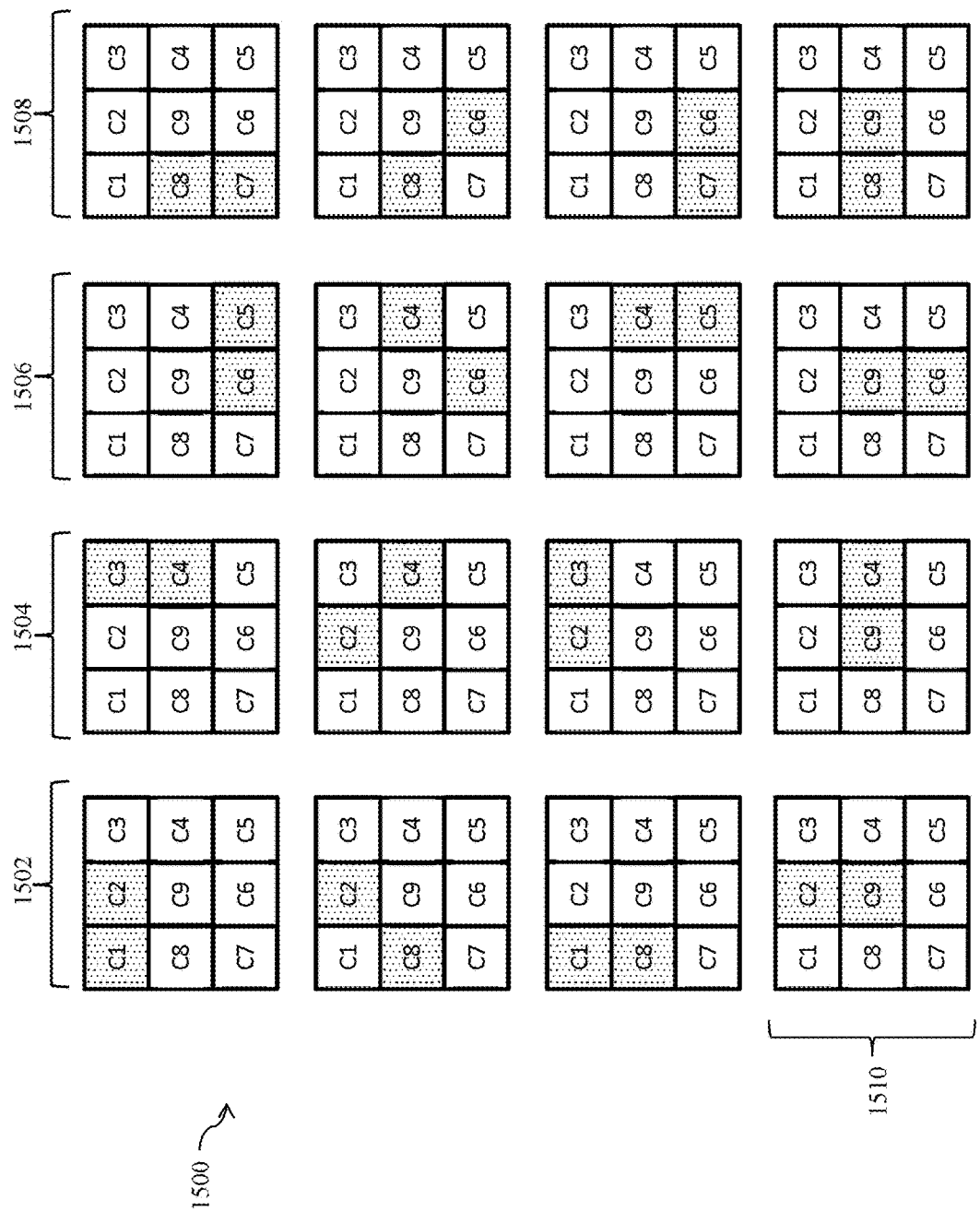
FIG. 15 shows a further illustrative embodiment of a sensing method.

FIG. 15 shows a further illustrative embodiment of a sensing method 1500. The method comprises identifying a first set of sensor capacitors {C1, C2, C8}, a second set of sensor capacitors {C2, C3, C4}, a third set of sensor capacitors {C4, C5, C6}, and a fourth set of sensor capacitors {C6, C7, C8}. The sets are mutually different sets. The method 1500 comprises stepping sequentially through these sets. In this example, N=9 and M=3. Thus, a two-dimensional sensor array is shown having nine sensor capacitors. The nine sensor capacitors may in this embodiment be sampled by four sampling sequences with a 2-out-of-3 sampling scheme each. Additional scans are performed as shown in row 1510, wherein the sensor capacitors in each of the groups {C2, C9}, {C4, C9}, {C6, C9}, and {C8, C9} are concurrently sampled. These additional scans cover the center of the sensor array. The method 1500 steps sequentially through the sets, and for each set (that contains 3 sensor capacitors), a 2-out-of-3 sampling scheme is applied. These sampling schemes also comprise a sequence, more specifically a sequence through mutually different subsets of each set: each subset contains 2 sensor capacitors that are sampled concurrently. The first three blocks of column 1502 show the different subsets within the first set, the first three blocks of column 1504 show the different subsets within the second set, the first three blocks of column 1506 show the different subsets within the third set, and the first three blocks of column 1508 show the different subsets within the fourth set. Thus, in this example, the different sets are identified, and then the first set is processed. Then, subsets {C1, C2}, {C2, C8}, {C2, C8} are identified in the first set, and subset {C1, C2} is the first subset that is processed. The sensor capacitors C1, C2 (i.e., the capacitors of the subset {C1, C2} of set {C1, C2, C8} are sampled concurrently and the resulting capacitance may be captured (e.g., by the above-mentioned capacitance-to-digital converter 302). Next, the capacitors of subset {C2, C8} are sampled concurrently and the resulting capacitance captured, and then the capacitors of subset {C2, C8} are sampled concurrently and the resulting capacitance captured. Next, the first additional scan of row 1510 may be performed, i.e. the concurrent sampling of capacitors C2 and C9. Subsequently, similar steps are performed for the other sets. Thus, FIG. 1500 shows a complete sampling sequence. The four columns 1502, 1504, 1506, 1508, from left to right indicate the four sampling sequences of 2-out-of-3.

FIG. 16 shows a schematic sensor capacitor arrangement 1600. As shown in FIG. 16, the central capacitor C9 of the embodiments shown in FIG. 14 and FIG. 15 may have 0-weight assigned and only contributes to the gain-setting term $\Sigma a_i$, which may remove position noise when the finger may be positioned over capacitor C9.

Figure 17:
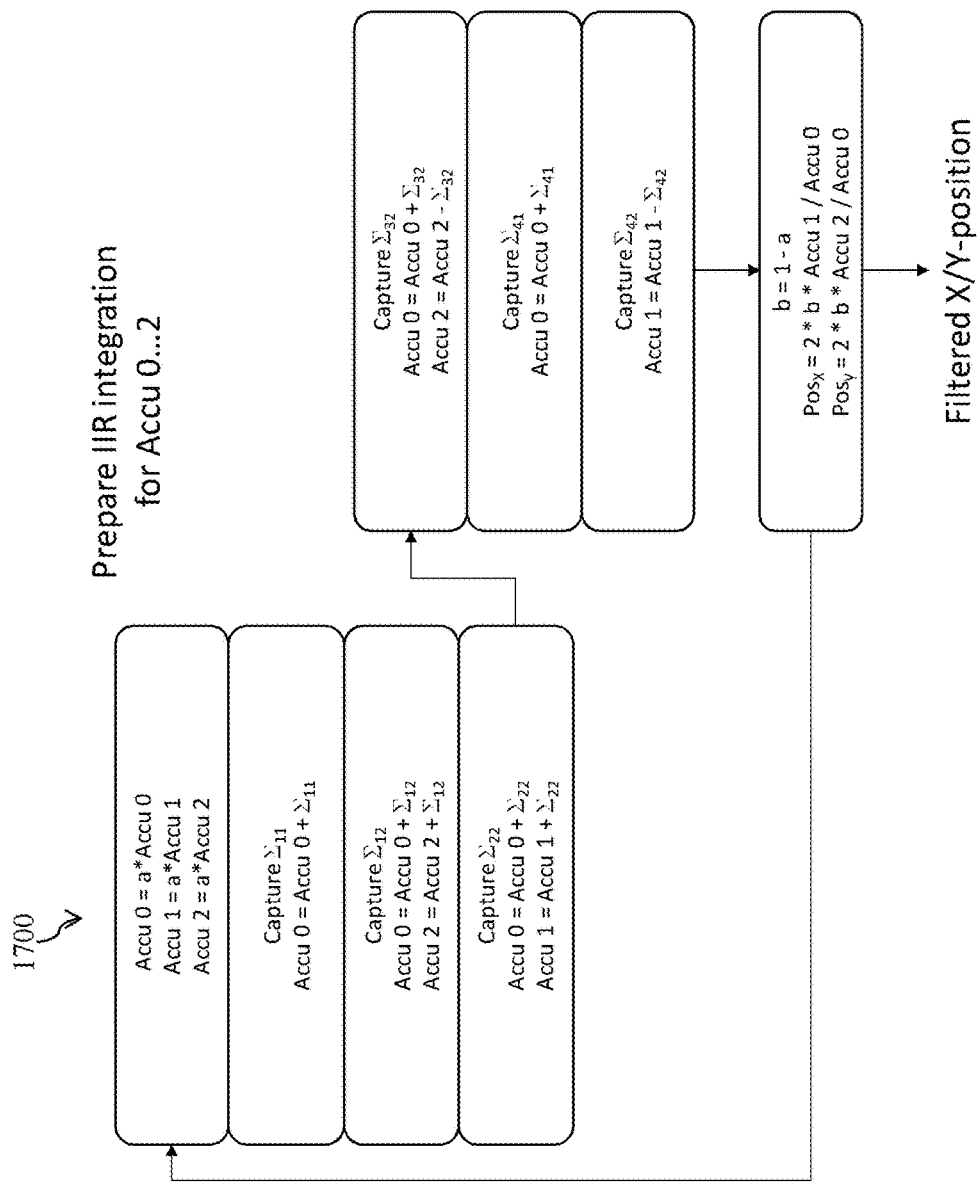
FIG. 17 shows an illustrative embodiment of a scan loop.

FIG. 17 shows an illustrative embodiment of a scan loop 1700. In particular, an embodiment of a scan loop for the 5-field sensor of FIG. 2C is shown. This scan loop may perform the following operations: direct finite impulse response (FIR) filtering of the measured capacitance values, infinite impulse response (IIR) filtering of the position components (accu increment/decrement), high-pass filtering by total activity level differences, position calculation from IIR-filtered position components, and adaptive setting of filter coefficient a. The embodiment of FIG. 17 has the advantage that it may not require a separate position filter loop and may hence save processing time. In detail, the scan loop may start with setting the feedback gain of the IIR filters by multiplying the accumulators by the filter coefficient a. The presently disclosed system and method facilitate achieving that the filter coefficient (coefficient a) is modified on-the-fly to adapt the filter characteristic to application needs. In some embodiments, the gain correction coefficient b may be set to 1. Subsequently all total activity levels are captured and immediately added to the required accumulators. When all required total activity levels have been captured the x- and y-positions are calculated from the accumulator contents. The presently disclosed system and method facilitate achieving that no outer control loop is required beyond the processing steps shown in FIG. 17. Furthermore, the strength of the position filtering may be set by a single parameter, the filter coefficient a. Capturing of the total activity levels may be interrupted when the A/D-conversion of one total activity level has been executed. It is an advantage of this embodiment that this position acquisition loop may be periodically triggered by a system clock event. Because the accumulators do not require a reset the scan loop may be re-entered at any time if the finger remains static on the touchpad.

Figure 18:
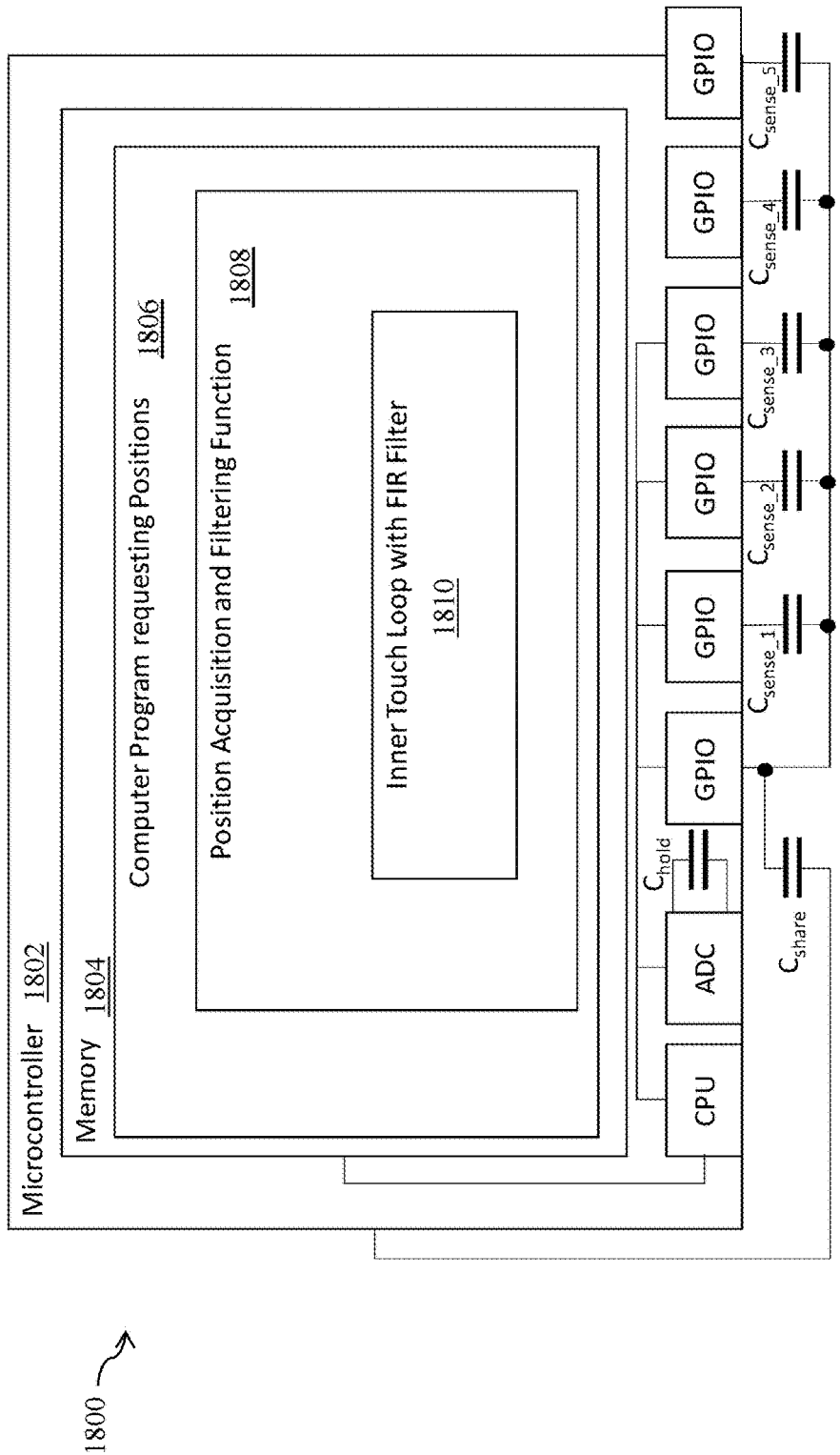
FIG. 18 shows a further illustrative embodiment of a sensor system.

FIG. 18 shows a further illustrative embodiment of a sensor system 1800. The system 1800 comprises a microcontroller 1802. The microcontroller 1802 comprises a memory 1804 in which a computer program 1806 is stored which can be executed by a processing unit (not shown) of the microcontroller 1802. A typical application of the five-sensor structure shown in FIG. 2C is a keypad or PIN-pad for smartcards, e.g. for authentication in banking and payment applications. In case of a touch by a human finger the identified touch-position may be communicated to a secure element for PIN-number decoding and PIN-matching. An embodiment of such application is illustrated by FIG. 18. A position acquisition and filtering function 1808 invokes an inner touch loop 1810 that operates the capacitance-to-digital conversion of the measured capacitances by controlling a plurality of GPIOs and an analog-to-digital converter (ADC). The position acquisition and filtering function 1808 is executed by the microcontroller 1802 under control of the computer program 1806. Another implementation of the touch processing sequence may be based on a physical integration as a hardware component into a microcontroller, because the simplicity of the sequence of processing steps may support an efficient implementation at economic gate-count.

The presently disclosed system and method may at least partly be executed by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form. The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 sensor system
102 array of sensor elements
104 processing unit
106 sensing method
108 the processing unit identifies mutually different sets of sensor elements within the array and steps sequentially through said sets
110 the processing unit identifies mutually different subsets of sensor elements within said sets and steps sequentially through said subsets
112 the processing unit concurrently samples the sensor elements within said subsets
200 sensor layout
202 x- and y-weights
204 sensor implementation
300 sensor system
302 capacitance-to-digital converter
304 capacitor selection controller
306 position calculation unit
400 sensor system
402 general-purpose input/output pin
404 general-purpose input/output pin
406 general-purpose input/output pin
408 general-purpose input/output pin
410 general-purpose input/output pin
412 general-purpose input/output pin
414 analog-to-digital converter
500 touched sensor
600 sensing method
602 first set
604 second set
606 third set
608 fourth set
700 sensing method
702 subsets within the first set
704 subsets within the second set
706 subsets within the third set
708 subsets within the fourth set
800 sensing method
802 subsets within the first set
804 subsets within the second set
806 subsets within the third set
808 subsets within the fourth set
900 schematic sensor capacitor arrangement
1000 scan steps
1100 scan steps
1200 scan steps
1300 position component filter
1400 sensing method
1402 subsets within the first set
1404 subsets within the second set
1406 subsets within the third set
1408 subsets within the fourth set
1500 sensing method
1502 subsets within the first set
1504 subsets within the second set
1506 subsets within the third set
1508 subsets within the fourth set
1510 other groups of sensor elements
1600 schematic sensor capacitor arrangement
1700 scan loop
1800 sensor system
1802 microcontroller
1804 memory
1806 computer program requesting positions
1808 position acquisition and filtering function
1810 inner touch loop with FIR filter

The invention claimed is:

1. A sensor system comprising a processing unit and an array of sensor elements, wherein the processing unit is configured to:
   identify mutually different sets of sensor elements within the array and scan sequentially through said sets, wherein the array comprises N sensor elements and each set comprises M sensor elements, wherein M<N and N and M are integers;
   identify mutually different subsets of sensor elements within said sets and scan sequentially through said subsets, wherein each subset comprises (M-1) sensor elements;
   concurrently sample the sensor elements within said subsets.

2. The sensor system of claim 1, wherein N=5 and M=3.

3. The sensor system of claim 1, wherein N=9 and M=4.

4. The sensor system of claim 1, wherein the sensor elements comprise sensor capacitors, and wherein concurrently sampling the sensor elements comprises measuring the accumulated capacitance of said sensor capacitors.

5. The sensor system of claim 1, wherein the processing unit is further configured to identify and skip redundant subsets.

6. The sensor system of claim 1, wherein the processing unit is connected to the array of sensor elements through a plurality of switching elements.

7. The sensor system of claim 6, wherein the switching elements comprise general-purpose input/output, GPIO, pins.

8. The sensor system of claim 1, wherein the processing unit is a microcontroller.

9. The sensor system of claim 1, being a touch-based sensor system.

10. A smart card comprising sensor system of claim 1.

11. A wearable device comprising the sensor system of claim 1.

12. A sensing method for use in a sensor system, wherein the sensor system comprises a processing unit and an array of sensor elements, and wherein the method comprises:
    the processing unit identifies mutually different sets of sensor elements within the array and scan sequentially through said sets;
    the processing unit identifies mutually different subsets of sensor elements within said sets and scans sequentially through said subsets, wherein the processing unit is further configured to identify and skip redundant subsets;
    the processing unit concurrently samples the sensor elements within said subsets.

13. A non-transitory computer-readable medium encoded with a computer program that, when executed by a processing unit, cause said processing unit to carry out the method of claim 12.

* * * * *